Oct. 9, 1934.  F. B. LLEWELLYN  1,976,570
CONSTANT FREQUENCY OSCILLATOR
Filed Aug. 28, 1930   3 Sheets-Sheet 2
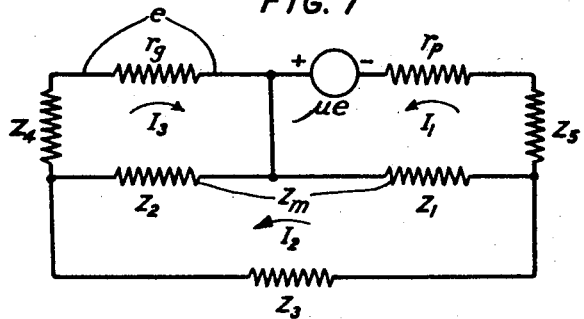
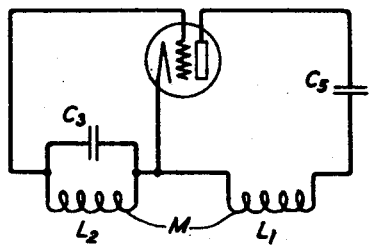 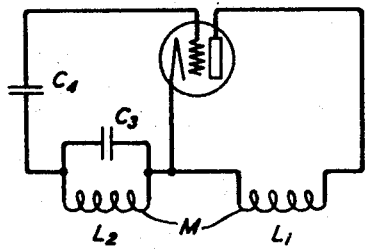
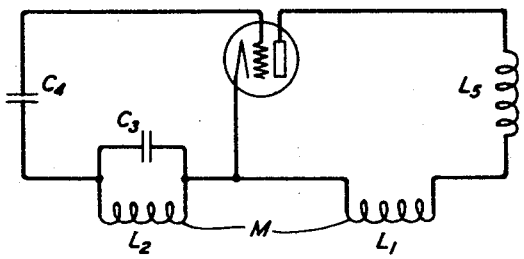
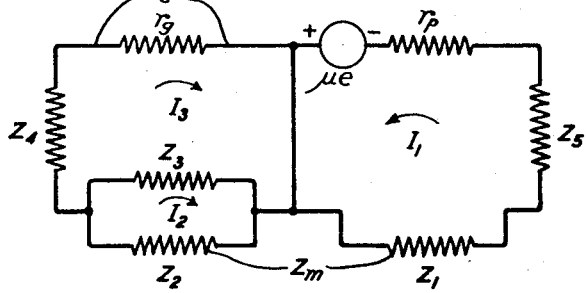
INVENTOR
F. B. LLEWELLYN
BY Guy T. Morris
ATTORNEY

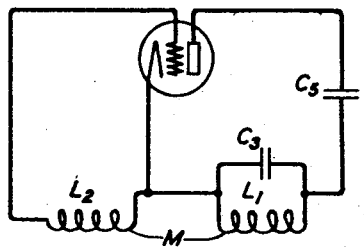
FIG. 12
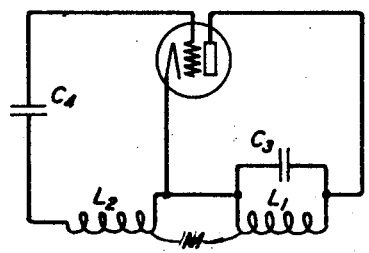
FIG. 13
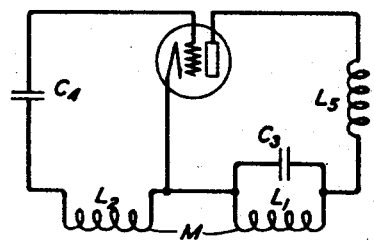
FIG. 14
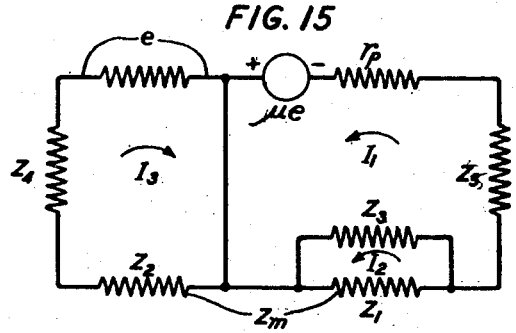
FIG. 15
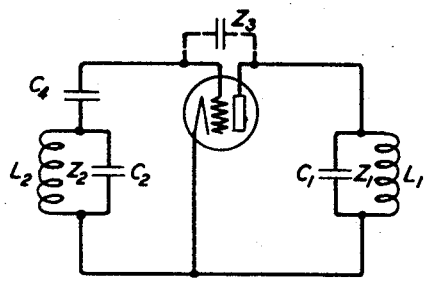
FIG. 16
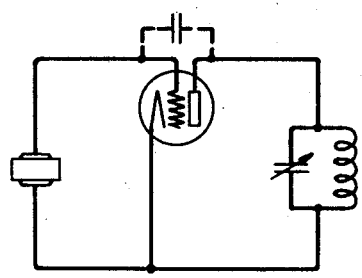
FIG. 16-A
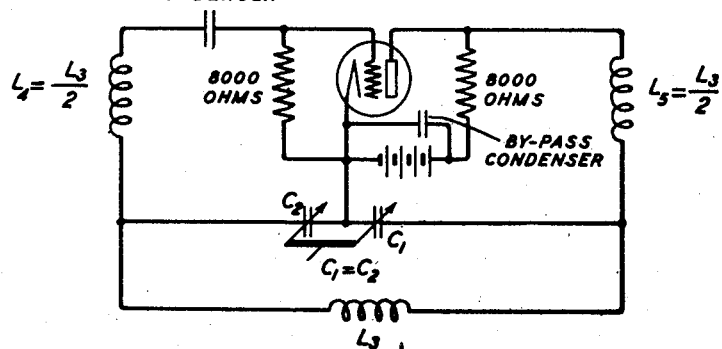
FIG. 17
INVENTOR
F. B. LLEWELLYN
BY *Guy T. Morris*
ATTORNEY Patented Oct. 9, 1934

1,976,570

UNITED STATES PATENT OFFICE 1,976,570

CONSTANT FREQUENCY OSCILLATOR

Frederick B. Llewellyn, Montclair, N. J., assignor to Western Electric Company, Incorporated, New York, N. Y., a corporation of New York Application August 28, 1930, Serial No. 478,373

8 Claims. (Cl. 250—36)

This invention relates to constant frequency electric discharge oscillators or, more specifically, to simple modifications of existing conventional types of electric discharge oscillators whereby their frequency stability is increased without detriment to their normal functions.

Its principal object is to improve the frequency stability of conventional types of electric discharge oscillator circuits as affected especially by changes in battery voltages or in load resistance, these being the more common contributing causes of frequency variation.

Another object of the invention is to evolve critical impedance relations in such conventional types of oscillators so as to achieve frequency stability as affected by changes in battery voltages or of load resistance, or as affected jointly by such types of variations.

Still further objects of the invention are to achieve the above related object with maximum simplicity of circuit, economy of plant and reliability of function; and especially with avoidance of dependence on experimental tests or adjustments in order to determine the optimum impedance relation on which the efficient functioning of the invention depends.

In the achievements of the above objects reliance is principally had on the use of a critically valued reactance of a type determined by the particular type of oscillator concerned, between either the control element of the electric discharge device and the frequency determining circuit, or correspondingly between the anode and frequency determining circuit, a choice or a combination of these two positionings being possible in most instances.

Since changes in battery voltages and load resistance are the principal factors of frequency change, an oscillator whose frequency is stable so far as affected by such changes may be regarded as a frequency stable oscillator for all practical purposes except as the reactive frequency determining elements may be affected by temperature changes. It happens, as in accordance with the requirements of the invention as above outlined, that when the oscillator is stable for changes in the voltage of any one of the three batteries, it is stable as to the voltage changes of all three batteries, it also being easily possible by the use of means to be described to achieve coincidence of this condition with a condition of stability with respect to changes in load resistance.

A result of the use of the various critical impedance relations required in the carrying out of the invention is that the frequency is accurately the resonant frequency of the tuned circuit, that is, the circuit which is usually considered as the frequency determining circuit. In this respect the oscillator of the invention differs fundamentally from conventional types of oscillators, or from oscillators of this invention modified by the omission of the stabilizing means, since the oscillation frequency in such oscillators is determined by the natural frequency of the oscillator circuit as a whole, which frequency differs very slightly, but very definitely, from the resonant frequency of the tuned circuit. Other aspects and features of the invention will be apparent from the following description when read in connection with the accompanying drawings, in which:

Figure 1:
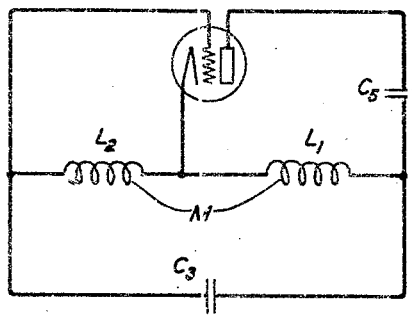
Fig. 1 illustrates the basic Hartley type of oscillator circuit with the stabilizing impedance of the invention, namely, a condenser, inserted in the plate lead.
Figure 2:
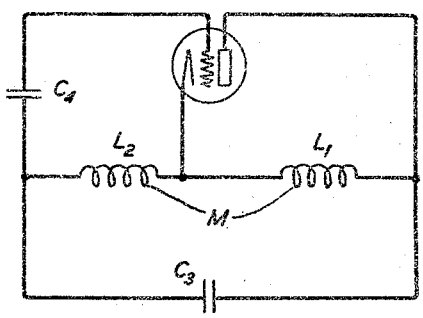
Fig. 2 illustrates the same fundamental circuit as that of Fig. 1 but with the stabilizing impedance, which again is a condenser, alternatively in the grid load.
Figure 3:
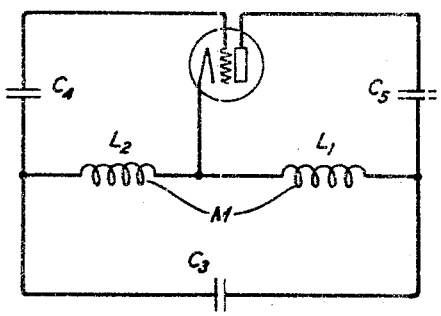
Fig. 3 illustrates the above type of oscillator circuit with stabilizing impedances in both the grid and plate leads, the showing being in a sense a combination of Figs. 1 and 2.
Figure 4:
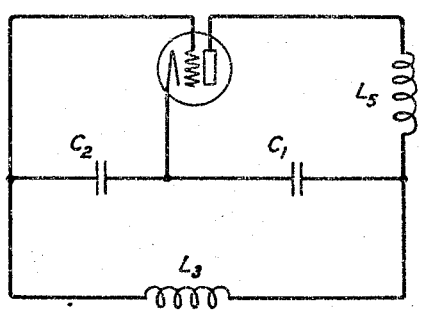
Fig. 4 is similar to Fig. 1 differing therefrom in that the Colpitts type of oscillator is assumed, this necessitating that the stabilizing impedance comprise an inductance instead of a condenser.
Figure 5:
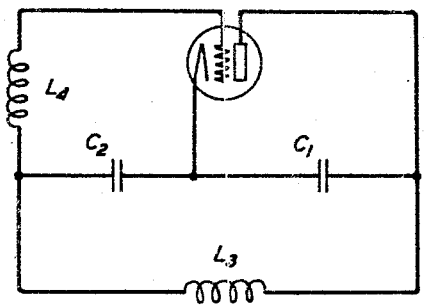
Figure 6:
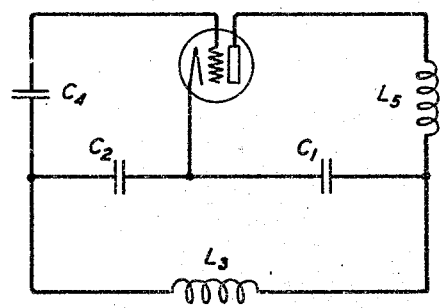

Figs. 5 and 6 correspond strictly to Figs. 2 and 3, having the same relation to Fig. 4 that Figs. 2 and 3 have to Fig. 1;

Fig. 7 illustrates a generalized circuit as adapted for mathematical analysis of the above circuit;

Figs. 8, 9 and 10 are analogous to Figs. 1, 2 and 3 or 4, 5 and 6, illustrating the principles of the invention as applied to a tuned grid type of oscillator;

Fig. 11 is similar to Fig. 7 and is a generalized circuit for mathematical analysis of the circuits of Figs. 8, 9 and 10;

Figs. 12, 13 and 14 are analogous to Figs. 8, 9 and 10 and their prototypes, being directed to the tuned plate type of oscillator;

Fig. 15 like Figs. 7 and 11 is a generalized circuit for mathematical analysis, and having reference to the circuits of Figs. 12, 13 and 14;

Fig. 16 illustrates a circuit to which the principles of the invention are applicable which may be considered as a combination of the tuned grid and tuned plate types of basic circuits;

Fig. 16a further illustrates how this type of circuit may be adapted for piezo-electric crystal control; and Fig. 17 illustrates how the diagrammatic circuits of Figs. 4, 5 and 6 may be elaborated for practical application.

Before proceeding with a detailed description of the various specific embodiments of the invention, it will be well to lay down the physical conditions upon which frequency of any vacuum tube oscillator depends.

In general, all such oscillators consist of, or may be resolved into, a tuned electrical circuit or network to which is attached a vacuum tube. Irrespective of details of any particular circuit, the frequency of the oscillator is completely determined by the following quantities, the designations used here being used uniformly throughout the subsequent analysis:

L, the self-inductance in the network,
M, the mutual inductance in the network,
C, the capacity in the network,
R, the resistance in the network,
$r_p$, the plate resistance of the vacuum tube,
$r_g$, the grid resistance in the vacuum tube, and
$\mu$, the amplification factor of the vacuum tube.

Of these quantities, L, C and M require little comment. They are merely symbolic of the elements of the electrical network. The quantity C includes the inter-electrode capacities of the tube when they become of consequence. These three quantities are assumed to be constant, an assumption which has been found very reasonable in practice. The quantity R represents the resistance in the network. For the purpose of this discussion the oscillator is assumed to deliver only a small amount of power to the tuned circuit, being used most often in such a manner as to supply voltage to the grid of an amplifier tube. Consequently, the electrical network external to the vacuum tube may, and should, be constructed in such a manner as to include a minimum amount of resistance. Under these conditions the losses in the circuit have been found to be practically all the result of the internal resistances, $r_p$ and $r_g$ of the vacuum tube.

These two quantities, $r_p$ and $r_g$, are very important, being principally responsible for changes in condition of the circuit as a whole. It should be realized that $r_g$ has the same relation to the static values of grid current and potential that $r_p$ has to the plate current and potential. The effect of varying the applied potential of the grid or plate, or of changing the filament current is directly to cause $r_p$ and $r_g$ to vary, usually in opposite directions. Further, when amplitude of oscillation varies, for which variation of battery voltages (grid, plate and filament) are again principally responsible, both $r_g$ and $r_p$ vary.

The quantity $\mu$ is the amplification factor and is here used with its usual significance as such. It varies with battery potentials but this variation is ordinarily very small, though not to be neglected.

It eventuates from the above considerations that if the reactive elements of the frequency determining circuit are constant, a permissible assumption, the frequency may be stabilized if adequate account is taken of changes in battery voltages and load resistance. This it is the purpose of the invention to achieve.

Consider first the form of Hartley oscillator shown in schematic form without indicating any special method of introducing the batteries, in Fig. 1. Fig. 7 shows the circuit equivalent of all the oscillators in Figs. 1 to 6 when the impedances are represented in generalized form, and therefore Fig. 7 will be employed for an analysis of the conditions necessary to secure independence of frequency and battery or applied voltages, and the results of this analysis will then be interpreted in terms of the special circuits of Figs. 1 to 6. In Fig. 7 the impedances $Z_4$ and $Z_5$ are inserted for the purpose of effecting independence of frequency and battery voltages, and the values which they should have in order to accomplish this result are found by the following analysis:

From Fig. 7 we have the circuit equations when the assumed current conditions are as shown by the arrows:

$$\mu e_g = I_1(r_p + Z_1 + Z_5) - I_2(Z_1 + Z_m) - I_3 Z_m$$
$$0 = -I_1(Z_1 + Z_m) + I_2 Z_0 + I_3(Z_2 + Z_m)$$
$$0 = -I_1 Z_m + I_2(Z_2 + Z_m) + I_3(r_g + Z_2 + Z_4)$$
$$e_g = I_3 r_g \quad (1)$$

These equations are expressions of Kirchkoff's law regarding the sum of the potentials in a closed circuit mesh, with respect to the meshes here illustrated. The Equations (1) effectively comprise only three simultaneous equations since the last one may be multiplied by the amplification factor so as to be put into the form of the first. There are only three such simultaneous equations because the network has only three meshes.

In the above equation $Z_0$ is symbolic of the series impedance of the tuned circuit. Using the symbolism of Fig. 7:

$$Z_0 = Z_1 + Z_2 + Z_3 + 2Z_m \quad (2)$$

Equations (1) may be rewritten in determinant form as follows:

$$\begin{vmatrix} (r_p + Z_1 + Z_5) & -(Z_1 + Z_m) & -(Z_m + \mu r_g) \\ -(Z_1 + Z_m) & Z_0 & (Z_2 + Z_m) \\ -Z_m & (Z_2 + Z_m) & (r_g + Z_2 + Z_4) \end{vmatrix} = 0 \quad (3)$$

This determinant form of the Equations (1) follows immediately from reducing Equations (1) to three equations.

In accordance with the accepted theory of the operation of oscillators, both the conditions necessary for oscillation to exist and the frequency of oscillation may be found from Equation (3). That is:

$$(r_p + Z_1 + Z_5)Z_0(r_g + Z_2 + Z_4)$$
$$+ (Z_1 + Z_m)(Z_2 + Z_m)(2Z_m + \mu r_g) =$$
$$Z_0 Z_m(Z_m + \mu r_g) + (Z_1 + Z_m)^2(r_g + Z_2 + Z_4)$$
$$+ (Z_2 + Z_m)^2(r_p + Z_1 + Z_5) \quad (4)$$

The next step is to express each of the generalized $Z$'s in the equivalent form of $(R + iX)$ where $i$ stands for the imaginary quantity $$\sqrt{-1},$$

and both R and X are real representing respectively resistance and reactance. In doing this, a great simplification results when it is recalled that the circuits external to the vacuum tube are assumed to have very little resistance, and that practically all of the losses in the network are caused by the tube resistances, $r_g$ and $r_p$, so that these two are the only resistances which need be retained in the analysis. With this understanding Equation (4) becomes:

$$[r_p + i(X_1 + X_5)]iX_0[r_g + i(X_2 + X_4)]$$
$$-(X_1 + X_m)(X_2 + X_m)[\mu r_g + i2X_m] =$$
$$-X_0 X_m[\mu r_g + X_m] - (X_1 + X_m)^2[r_g + i(X_2 + X_4)]$$
$$-(X_2 + X_m)^2[r_p + i(X_1 + X_5)] \quad (5)$$

In order for Equation (5) to be true, both the real and imaginary portions must separately be equal to zero. If Equation (5) (which comes naturally from Equation (3) with the given substitutions) is separated into its real and imaginary parts, the resulting two equations must be simultaneous, and between them express the frequency and the relative values which $r_p$ and $r_g$ must assume in order for oscillations to exist. The particular aim in the present case is to find whether values of $X_4$ and/or $X_5$ exist which will enable the frequency to be expressed in terms of the constants of the circuit external to the vacuum tube, so that if $r_p$, $r_g$ and $\mu$ should vary the frequency being dependent upon the external circuit, only, will remain constant.

From (5) then, the real and imaginary parts give the following two equations:

$$-X_0[r_p(X_2+X_4)+r_g(X_1+X_5)]$$
$$-\mu r_g(X_1+X_m)(X_2+X_m)=-X_0 X_m \mu r_g$$
$$-(X_1+X_m)^2 r_g-(X_2+X_m)^2 r_p \quad (6)$$

$$X_0[r_p r_g-(X_1+X_5)(X_2+X_4)]$$
$$-2X_m(X_1+X_m)(X_2+X_m)=-X_0 X_m^2$$
$$-(X_1+X_m)^2(X_2+X_4)-(X_2+X_m)^2(X_1+X_5) \quad (7)$$

There are certain mathematical rules for finding whether the desired constancy of frequency may be obtained from the conditions given by Equations (6) and (7). Without, however, going into detail in regard to these, it is easy to see from Equation (7) that if $X_4$ and $X_5$ have such values as to satisfy the equation $$2X_m(X_1+X_m)(X_2+X_m)=$$
$$(X_1+X_m)^2(X_2+X_4)+(X_2+X_m)^2(X_1+X_5) \quad (8)$$

(which is obtained by including all terms of (7) which do not contain $X_0$), then the frequency of oscillation is exactly that which will cause $X_0$ to become zero, and will remain so, no matter what values may be taken by $r_p$, $r_g$, and $\mu$. In other words, the oscillation frequency is equal to the series resonant frequency of the tuned circuit.

In order to complete the general demonstration, it remains to show that the values imposed on Equation (7) by the condition of Equation (8) do not require physically impossible values of $r_p$, $r_g$ and $\mu$ in order to satisfy Equation (6) and thus maintain oscillations. To do this, assume that Equation (8) is solved for either $X_4$ or $X_5$ and substitute in Equation (6) remembering that $X_0$ is zero. When Equation (8) is solved for $X_4$ and the result substituted in Equation (6) there results $$\frac{r_p}{r_g}=\mu\left(\frac{X_1+X_m}{X_2+X_m}\right)-\left(\frac{X_1+X_m}{X_2+X_m}\right)^2 \quad (9)$$

Inspection of this expression shows that the conditions required are physically possible, and it follows that the amplitude of oscillation increases or decreases until the effective values of $r_p$ and of $r_g$, which are measures of the dissipation of energy on the plate and on the grid sides, take up the values specified by the conditions of Equation (9). Thus, for instance, if $X_1$ and $X_2$ were approximately equal, then $r_p$ would have to be $(\mu-1)$ times as large as $r_g$ before the oscillation amplitude settled down to a steady state value. To many who are accustomed to neglect the losses occurring on the grid side of a vacuum tube when dealing with oscillator problems, this low value of $r_g$ will appear as somewhat unusual. In this connection it may be pointed out that the low value of $r_g$ is not in any way a special requirement imposed by the stabilizing reactances, $X_4$ and $X_5$, but is inherent in vacuum tube oscillators in general, unless particular conditions are arranged to render it otherwise. For instance, it is a well known experimental fact that resistances of the order of 4000 ohms may be placed across the grid to filament terminals of an oscillator employing any of the more common types of three element receiving amplifier tubes without stopping the oscillations, when a good low-loss tuned circuit is employed. In view of the fact that the amplitude of the oscillations is commonly limited by $r_g$, this is evidence that stable oscillations may be secured with values of $r_g$ which are of the order of two or three thousand ohms.

The demonstration may be made more rigid by the use of Equations (6) and (7) for the special case where $X_1=X_2$ and $X_4=X_5=X_m=0$, in which the stabilizing reactances have been omitted. For such a simplified circuit it is found, by elimination of $X_0$ between (6) and (7) that $$\frac{r_p}{r_g}=\mu\left[\frac{r_p r_g - X_1^2}{r_p r_g + X_1^2}\right]-1 \quad$$

Now, $X_1$ is of the order of five or six hundred ohms at the most, while both $r_p$ or $r_g$ are at least enough larger than this in the case of the more commonly used vacuum tubes so that the expression for $r_p/r_g$ is roughly equal to $(\mu-1)$. Thus, in the simplest kind of vacuum tube circuit it is seen that $r_g$ is liable to be appreciably smaller than $r_p$, and by no means negligible in its effect.

To return to Equation (8) which expresses the relation between $X_4$, $X_5$, and the other circuit reactances which are necessary to cause the frequency to be independent of battery voltages, we note that although Equation (8) is still in generalized form, and is yet to be applied to the particular cases shown in Figs. 1 to 6, the very significant fact that the oscillation frequency for such type of stability must be the series resonant frequency of the tuned circuit is a direct consequence of the requirements of the equation. This fact will be found to be substantially true of the forms of circuit shown in Figs. 1–15, and is a distinctive feature of the stable oscillator circuits of the invention.

For application to the Hartley type of oscillator the various terms of Equation (8) have the following significance:

$$X_1=\omega L_1$$
$$X_2=\omega L_2$$
$$X_m=\omega M$$

where $\omega=2\pi \times$ frequency and $X_4$ and/or $X_5$ are to be determined. In the case of Fig. 1 where stabilization is accomplished on the plate side we put $X_4$ equal to zero. Then solving Equation (8) for $X_5$ we find $$X_5=2\omega M\left(\frac{L_1+M}{L_2+M}\right)-\omega L_2\left(\frac{L_1+M}{L_2+M}\right)^2-\omega L_1$$

$X_5$ is thus required to be negative, so that a capacitative reactance is necessary for plate stabilization of a Hartley type oscillator. Thus putting $$X_5=-\frac{1}{\omega C_5}$$

and remembering that since $X_0=0$, the angular frequency is given by $$\omega^2=1/C_3(L_1+L_2+2M)$$

so that finally we get $$C_5=C_3\frac{L_1+L_2+2M}{L_1+L_2\left(\frac{L_1+M}{L_2+M}\right)^2-2M\left(\frac{L_1+M}{L_2+M}\right)} \quad (10)$$

which is the value of capacity which should be inserted between the plate and the tuned circuit of a Hartley type oscillator in order to cause the frequency to remain constant when the battery voltages are varied, and there is no reactance between the grid and tuned circuit. Of course, in actual practice it is necessary to provide a D. C. path for the space current of the tube which can be accomplished by shunting the condenser, $C_5$, with a high impedance choke.

In actual practice a stopping condenser is often desirable in the $X_4$ position, instead of a direct connection between grid and tuned circuit. This stopping condenser and the accompanying leak are desirable inasmuch as it has been found by experience that an oscillator operating with a leak and condenser combination is inherently more stable as regards change of frequency with change of battery voltage than an oscillator with a direct d. c. low resistance path from grid to filament, even when a battery is employed to impose a negative bias on the grid. The explanation for this improved stability lies in the fact that the grid leak tends to keep the grid resistance, $r_g$ constant. It frequently happens when the leak and condenser combination is used, that difficulty is experienced in avoiding "blocking" when a large enough condenser to have negligible reactance is employed. In such cases the required value of $C_5$ may be chosen in the manner discussed in connection with Fig. 3, below, which allows for a finite reactance between grid and tuned circuit, or else, as another alternative, the plate may be directly connected to the tuned circuit so that $X_5$ is zero, and stabilization may be accomplished by choosing the value of $C_4$ in accordance with the requirements then imposed by Equation (8) which refer to Fig. 2 and necessitate that:

$$C_4 = C_3 \frac{L_1 + L_2 + 2M}{L_1 + L_2\left(\frac{L_2+M}{L_1+M}\right)^2 - 2M\left(\frac{L_2+M}{L_1+M}\right)} \quad (11)$$

For Fig. 3 the same kind of substitution of the conditions of the circuit into Equation (8) shows that $$\frac{1}{C_5} + \frac{1}{C_4}\left(\frac{L_1+M}{L_2+M}\right)^2 = \frac{1}{C_3}\left[\frac{L_1 + L_2\left(\frac{L_1+M}{L_2+M}\right)^2 - 2M\left(\frac{L_1+M}{L_2+M}\right)}{L_1+L_2+2M}\right] \quad (12)$$

If $C_4$ is very small, it is evident that an inductance must be used instead of a capacity at $C_5$. The value of the inductance is:

$$L_5 = (L_1+L_2+2M)\frac{C_3}{C_4}\left(\frac{L_1+M}{L_2+M}\right)^2 - L_1 - L_2\left(\frac{L_1+M}{L_2+M}\right)^2 + 2M\left(\frac{L_1+M}{L_2+M}\right) \quad (13)$$

In all three of the cases considered thus far, the equations show that the value of the stabilizing capacity or inductance depends upon the values of $L_1$, $L_2$, $M$, and $C_3$, so that if the frequency of the oscillator is varied intentionally, by changing $L_1$ for instance, then a different value of stabilizing capacity or inductance would be required to secure independence of frequency and battery voltages at the new frequency. If, however, the circuit is so constructed that $M$ is zero and $L_1$ and $L_2$ are made so that they remain always equal to each other, then the value of the stabilizing element depends upon $C_3$ only, and the frequency may be changed by varying $L_1$ and $L_2$ simultaneously without destroying the stabilizing adjustment.

This property may be utilized to even greater advantage in connection with the Colpitts type of oscillator, which is illustrated in Figs. 4, 5 and 6 and will now be investigated with the aid of Equation (8) in the same manner in which the relations necessary for stabilizing the Hartley oscillators were secured. Thus, for the Colpitts circuit $$X_1 = -\frac{1}{\omega C_1}$$

$$X_2 = -\frac{1}{\omega C_2}$$

$$X_m = 0$$

$$\omega^2 = \frac{1}{L_3}\left(\frac{1}{C_1}+\frac{1}{C_2}\right)$$

For the case of Fig. 4 which utilizes plate stabilizing, so that $X_4=0$, Equation (8) gives $$L_5 = L_3\left(\frac{C_2}{C_1}\right) \quad (14)$$

For the case of Fig. 5 which utilizes grid stabilizing, so that $X_5=0$, Equation (8) gives $$L_4 = L_3\left(\frac{C_1}{C_2}\right) \quad (15)$$

For the case of Fig. 6 which utilizes both plate and grid stabilizing, so that a moderately small condenser may be used at $X_4$, Equation (8) requires $$L_5 = L_3\left[\frac{C_2}{C_1}+\frac{C_2^2}{C_4}\frac{1}{C_1(C_1+C_2)}\right] \quad (16)$$

Equation (8) may also be satisfied by inductances in both plate and grid circuits provided that the values of the inductances satisfy the equation $$L_4\left(\frac{C_2}{C_1}\right)+L_5\left(\frac{C_1}{C_2}\right)=L_3 \quad (17)$$

In Equations (14) and (15) and (17) it is evident that if the condensers, $C_1$ and $C_2$ are connected together in a "gang" mounting so that when they are varied, the ratio of their capacities remains constant, then the frequency of the oscillator may be changed by changing $C_1$ and $C_2$ without disturbing the stabilizing adjustment which causes the frequency to be independent of battery voltages.

Figs. 8, 9 and 10 show conventional drawings of the type of oscillator circuit known as a "feed-back" or sometimes as a "tuned input" circuit. In Fig. 8 stabilization is accomplished on the plate side, in Fig. 9 on the grid side, and in Fig. 10 on both sides. Fig. 11 shows the generalized circuit suitable for mathematical analysis in a manner similar to that employed for the Hartley and the Colpitts types of circuits. The equations expressing Kirchkoff's law for the oscillatory circuit of Fig. 11 may be set up in the form of the following determinant $$\begin{vmatrix} (r_p+Z_1+Z_5) & -Z_m & -(\mu r_g+Z_m) \\ -Z_m & Z_0 & Z_2 \\ -Z_m & Z_2 & (r_g+Z_2+Z_4) \end{vmatrix} = 0 \quad (18)$$

Where the symbol, $Z_0$, is employed to represent the sum of $Z_2$ and $Z_3$. As before the external circuit impedances are mainly reactive, and accordingly all resistances except $r_p$ and $r_g$ may be neglected. The expansion of Equation (18) therefore yields the following two equations corresponding respectively to the real part and the imaginary parts:

$$-X_0[r_p(X_2+X_4)+r_g(X_1+X_5)]-$$
$$X_2X_m\mu r_g=-X_0X_m\mu r_g-$$
$$X_2^2 r_p-X_m^2 r_g \quad (19)$$

$$X_0[r_p r_g-(X_1+X_5)(X_2+X_4)]-$$
$$2X_2X_m^2=-X_mX_2X_0-$$
$$X_m^2(X_2+X_4)-(X_1+X_5)X_2^2 \quad (20)$$

Together these two equations express the frequency and the conditions required for oscillation. From Equation (20) it is evident that $r_p$, $r_g$ and $\mu$ may vary without affecting the frequency provided that $$2X_2X_m^2=X_m^2(X_2+X_4)+(X_1+X_5)X_2^2 \quad (21)$$

which is the condition for stabilizing the feed-back oscillator which corresponds to Equation (8) for the Hartley and Colpitts types of oscillators. The fulfillment of the conditions of Equation (21) causes the value of $X_0$ to become zero, so that similarly to the Hartley and Colpitts type, the frequency of the stabilized feed-back oscillator is the series resonant frequency of the tuned circuit. Under the restriction of Equation (20) the relations necessary for oscillation to exist are shown by Equation (19) to be:

$$\frac{r_p}{r_g}=\frac{M}{L_2}\left[\mu-\frac{M}{L_2}\right] \quad (22)$$

which gives a physically possible relation between $r_p$, $r_g$ and $\mu$.

When applied to the circuit of Fig. 8, the condition for stabilization on the plate side required by equation (21) is a capacity whose size is given by $$C_5=C_3\frac{L_2}{L_1}\left(\frac{1}{1-k^2}\right) \quad (23)$$

where $k$ is the coefficient of coupling between $L_1$ and $L_2$, and is defined by $$\sqrt{L_1L_2}=kM$$

Similarly, the circuit of Fig. 9 requires a capacity for stabilization whose size is given by $$C_4=C_3\left(\frac{k^2}{1-k^2}\right) \quad (24)$$

where $k$ has the same meaning as above.

When both plate and grid stabilization are employed as in Fig. 10, then it is sometimes convenient to arrange the values of $X_4$ and $X_5$ in such a way that $X_5$ is inductive so that a choke will not be necessary to provide a d. c. path for the space current. This may be done if $C_4$ is small enough, for from Equation (21)

$$L_5=L_1\left[k^2\left(1+\frac{C_3}{C_4}\right)-1\right] \quad (25)$$

which shows that an inductance may be used for stabilizing the feed-back type of oscillator so long as $C_4$ is small enough to make the expression on the right hand side of Equation (25) greater than zero. Otherwise a capacity of the following value should be used:

$$C_5=C_3\frac{L_2}{L_1}\left(\frac{1}{1-k^2\left(1+\frac{C_3}{C_4}\right)}\right) \quad (26)$$

Figs. 12, 13 and 14 show conventional drawings of the type of oscillator circuit known as a "reversed feed-back" or sometimes as a "tuned-output" type of oscillator, with the application of stabilizing impedances to cause the frequency to be independent of changes in battery voltages. In Fig. 12 the stabilizing impedance is placed between the plate and the tuned circuit, in Fig. 13, between the grid and coupling coil, and in Fig. 15, stabilization is accomplished by impedances placed in both positions. Fig. 15 shows a generalized circuit from which the mathematical analysis applicable to the cases of either Figs. 12, 13 or 14 may be obtained.

From Fig. 15 the circuit equations may be written in accordance with Kirchkoff's law, and the result written in the following determinant form:

$$\begin{vmatrix} (r_p+Z_1+Z_5) & Z_1 & -(\mu r_g+Z_m) \\ Z_1 & Z_0 & -Z_m \\ -Z_m & -Z_m & (r_g+Z_2+Z_4) \end{vmatrix}=0 \quad (27)$$

where the symbol, $Z_0$, is used to represent the sum of $Z_1$ and $Z_3$. As before, the external circuit impedances are mainly reactive, and accordingly all resistances except $r_p$ and $r_g$ may be neglected. The expansion of Equation (27) therefore yields the following two equations corresponding respectively to the real part and the imaginary part of the expansion of Equation (27).

$$-X_0[r_p(X_2+X_4)+r_g(X_1+X_5)]-X_1X_m\mu r_g=$$
$$X_0X_m\mu r_g-X_1^2 r_p-X_m^2 r_p \quad (28)$$

$$X_0[r_p r_g-(X_1+X_5)(X_2+X_4)]-2X_1X_m^2=-$$
$$X_0X_m^2-X_1^2(X^2+X_4)-X_m^2(X_1+X_5) \quad (29)$$

Together these two equations express the frequency and the conditions required for oscillation. From Equation (29) it is evident that $r_p$, $r_g$ and $\mu$ may vary without affecting the frequency provided that $$2X_1X_m^2=X_1^2(X_2+X_4)+X_m^2(X_1+X_5) \quad (30)$$

which is the condition for stabilizing the reversed feed-back oscillator which corresponds to Equation (8) for the Hartley and Colpitts types of oscillators and Equation (21) for the feed-back oscillator. The fulfillment of the conditions of Equation (30) causes the value of $X_0$ to become zero, so that similarly to the Hartley, Colpitts and feed-back types, the frequency of the stabilized reversed feed-back oscillator is the series-resonant frequency of the tuned circuit. Under the restriction of Equation (30) the relations necessary for oscillation to exist are shown by Equation (28) to be:

$$\frac{r_p}{r_g}=\frac{L_1}{M}\left[\mu-\frac{L_1}{M}\right] \quad (31)$$

which gives a physically possible relation between $r_p$, $r_g$ and $\mu$.

When applied to the circuit of Fig. 12, the condition for stabilization on the plate side required by Equation (30) is a capacity whose size is given by $$C_5=C_3\left(\frac{k^2}{1-k^2}\right) \quad (32)$$

where $k$ is the coefficient of coupling between $L_1$ and $L_2$ and is defined by $$\sqrt{L_1L_2}=kM.$$

Similarly the circuit of Fig. 13 requires a capacity for stabilization whose size is given by $$C_4=C_3\left(\frac{L_1}{L_2}\right)\left(\frac{1}{1-k^2}\right) \quad (33)$$

where $k$ has the same meaning as above.

When both plate and grid stabilization are employed as in Fig. 10, then it is sometimes convenient to arrange the values of $X_4$ and $X_5$ in such a way that $X_5$ is inductive so that a choke will not be necessary to provide a d. c. path for the space current. This may be done if $C_4$ is small enough, for from Equation (30)

$$L_4 = L_1\left[1 + \frac{1}{k^2}\left(\frac{L_1 C_3}{L_2 C_4} - 1\right)\right] \quad (34)$$

which shows that an inductive reactance may be used for stabilizing the reversed feed-back type of oscillator so long as $C_4$ is small enough to make the expression on the right-hand side of Equation (34) greater than zero. Otherwise, a capacity of the following value should be used:

$$C_4 = \frac{C_3}{\frac{1}{k^2}\left(1 - \frac{L_1 C_3}{L_2 C_4}\right) - 1} \quad (35)$$

As an instance of the stabilizing of another general class of oscillator circuits which has wide application to a number of special cases, attention is drawn to the tuned-plate, tuned-grid circuit of Fig. 16. The input and output circuits are shown in the drawing as consisting of condenser and inductance combinations connected in parallel. At any specified frequency, however, the parallel combination may be replaced by a series circuit, or, in fact, by any form of network which has the same impedance, and none of the currents or voltages in the remainder of the circuit will be affected. In particular, the resistance and capacity shown on the input side in Fig. 16 may be replaced by a piezo-electric crystal, as shown in Fig. 16a, having the same impedance at the operating frequency without affecting the currents and voltages in the remaining parts of the circuit.

It is well known that the frequency of such a piezo-electric oscillator is less affected by changes in battery voltages than is the frequency of the ordinary, non-stabilized electric oscillator. However, the battery voltages do influence the frequency of the piezo-electric oscillator to an extent which is undesirable for certain accurate types of work. It therefore becomes useful to apply stabilization to the piezo-electric oscillator. It will be shown that the stabilization may be accomplished by adjusting the size of the output tuning condenser to such a value that impedance of the output circuit bears a certain critical relation to the impedance of the crystal, while at the same time the circuit as a whole fulfills the conditions necessary for the existence of oscillations.

The same kind of stabilization is, of course applicable to an electric oscillator having analogous relations between the input and output impedances. Thus, it is possible to stabilize the Hartley oscillator by moving the connection between the filament and coil to different positions on the coil, until that one which gives the proper ratio of input to output impedances has been found. In the case of the Hartley and Colpitts oscillators, however, it is more often preferable to stabilize by the special circuit arrangements illustrated in Figs. 1 to 8, while, on the other hand, the tuned-grid tuned-plate type of circuit lends itself readily to stabilization by adjustment of the output circuit.

Numerical expressions for the proper impedance relations may be obtained by noting that the circuit of Fig. 16 may be generalized into the circuit of Fig. 7 by regarding $Z_4$ and $Z_5$ as zero, while $Z_2$ comprises the whole input network which may consist of various arrangements of coils, condensers, grid-leaks and the like, and, in a similar fashion, $Z_1$ comprises the whole output network. The mathematical analysis given in connection with Fig. 7 may therefore be adapted immediately, and in place of Equations (6) and (7) we have the two expressions $$X_0(r_g X_1 + r_p X_2) + \mu r_g X_1 X_2 = r_p X_2^2 + r_g X_1^2 \quad (36)$$

$$X_0(r_p r_g - X_1 X_2) = -X_2^2 X_1 - X_1^2 X_2 \quad (37)$$

The requirements of Equation (36) are $$r_p = r_g \frac{X_1}{X_2}\left(\frac{\mu X_2 + X_0 - X_1}{X_2 - X_0}\right) \quad (38)$$

which may be used to eliminate $r_p$ in Equation (37) and gives $$X_0 r_g^2 (\mu X_2 + X_0 - X_1) = X_2^2 (X_0 - X_1 - X_2)(X_2 - X_0) \quad (39)$$

In order for the frequency to be independent of $r_g^2$ it is necessary for one of the factors on the left-hand side of the equation to be zero. This, however, necessitates that one of the factors on the right-hand side of Equation (39) should also be zero. Investigation shows that the only pair of factors of Equation (39) that may both be zero, and still be consistent with Equation (38) are the following:

$$\mu X_2 + X_0 - X_1 = 0 \quad (40)$$

$$X_2 - X_0 = 0 \quad (41)$$

Elimination of $X_0$ between these two expressions results in the following relation:

$$(1 + \mu) X_2 = X_1 \quad (42)$$

The frequency is then given by $$X_1 + X_3 = 0 \quad (43)$$

Equation (42) expresses the relation which is required between the reactances of the input and the output network in order to provide for a constant frequency with varying battery voltages.

In the application of this type of stabilization to a piezo-electric oscillator such as is shown in Fig. 16a it sometimes happens that stability improves with decrease in the value of the output tuning capacity but oscillations cease before complete stabilization is secured. The explanation for this and its remedy may be obtained from Equations (42) and (43) by supposing that the reactance, $X_2$, of the crystal may be represented by an anti-resonant circuit, $C_2$ and $L_2$, in series with a condenser $C_4$ while the output reactance, $X_1$, consists of the anti-resonant circuit $C_1$ and $L_1$. Thus, the value of $C_1$ which satisfies Equations (42) and (43) is $$C_1 = \frac{L_2}{L_1} C_2 - C_3 + \frac{(1+\mu)\frac{L_2}{L_1} C_3}{1 + (1+\mu)\frac{C_3}{C_4}} \quad (44)$$

The effective value of $C_4$ in the equivalent crystal network is much smaller than $C_3$ so that Equation (44) becomes approximately $$C_1 = \frac{L_2}{L_1}(C_2 + C_4) - C_3 \quad (44a)$$

This shows that when $C_3$ is too large a negative value of $C_1$ is likely to be required in order to effect stabilization. When this happens, as mentioned above, the remedy may be accomplished, as shown in Equation (44a), by adding capacity in parallel with the crystal, which increases $(C_2 + C_4)$, or by using a screen tube, which decreases the value of $C_3$.

In the analyses above the requirement of a capacity or an inductance is indicated by the fact that the signs come out right in the final equations. If the wrong type of reactive elements were used, it would result, for example, that a negative inductance apparently would be required, which of course would indicate the requirements of the capacitance.

Of course Figs. 1 to 15 are intended to represent only the fundamentals of the corresponding circuits. For practical operation these circuits would have to include the usual stopping condensers, leak resistances, sources, choke coils, etc. These circuit elements should be so valued and so introduced into the oscillator circuit as a whole as not to interfere with the relations required by the analyses, so as not to annul the stabilizing effects of the stabilizing impedances as valued in such analyses. As to the choke coils, this means merely that it must be what its name implies, that is, a substantially infinite impedance. In the case of a Hartley type oscillator and where the reactance is chosen to be located in the grid leads instead of in the plate leads, a condenser must be used. This may replace the conventional stopping condenser. Where the reactance is in the plate lead for a similar type of oscillator, the stopping condenser in the grid lead should be large so as to have negligible impedance. Similar expedients are suggested for the impedance for the other types of oscillator circuits.

As illustrating how a typical one of the simplified circuits of Figs. 1 to 15 may be elaborated into a conventional circuit of this kind including the various adjunctory circuit elements, Fig. 17 should be referred to. This figure illustrates a complete wiring diagram of the oscillator of Fig. 6 and Equation (17). This oscillator is stabilized by means of the inductance $L_5$ in the plate circuit and the inductance $L_4$ in the grid circuit, which correspond to the requirements of Equation (17). In addition to satisfying this relation, it may be noticed that the value of $L_5$ is such as to tune with $C_1$ to the oscillation frequency, and, similarly, the value of $L_4$ is such as to tune with $C_2$ to the oscillation frequency. Under such conditions a resistance of appreciable value may be introduced into the circuit of $L_5$ without affecting the frequency or the stabilization. The reason for this may be explained briefly as follows:

Consider a single series circuit, that is, one of the three meshes of Fig. 17, for instance that composed of the elements $r_g$ in parallel with the 8000 ohm leak, $L_4$, and $C_2$. This circuit is in series resonance at the frequency at which the circuit as a whole oscillates. Therefore it tends to introduce resistance impedance only into whatever circuits it is reactively coupled with. Thus the effect of this circuit upon the adjacent circuit, $L_5$, $C_1$, $C_2$ with which it is coupled is to introduce resistance only. Similarly, if this last circuit operates at series resonance, only resistance is introduced into the plate circuit, $L_5$, $C_1$ and $r_p$ in parallel with the d. c. feed of 8000 ohms, with which it is coupled. Hence, if the plate circuit likewise operates at series resonance, a change in resistance of any part of the circuit will change only the resistance into which the tube works and therefore leave the frequency unaltered.

In a more general sense, any of the oscillator forms discussed may be stabilized even when the resistance in the external circuit is not inappreciable, the effect of the external resistance manifesting itself in two ways: First, a value of stabilizing reactance slightly different from that given in the above formulas may be required and second, the frequency, instead of being absolutely independent of battery voltage variations, goes through a maximum or a minimum as the battery voltage is changed, the voltage at which this maximum or minimum occurs depending upon the exact value of the stabilizing reactance. An exact mathematical analysis of this more general case yields formulas for the stabilizing reactances which involve $r_g$ or $r_p$ and hence are not as useful, even in cases where the resistance in the external circuit is of importance, as are the formulas presented above, which may be used as first approximations in any event.

In practice it has been found that when ordinary precautions are taken to insure a low-loss external circuit, the relations given above hold very accurately, and any variation in frequency then existing when battery voltages are varied may be traced to either one of two causes, both of which may be guarded against. First, the inter-electrode capacities of the tube may be sufficient to enter into the impedance relations. In this event, a change in the form of the circuit, such as the use of the tuned-plate tuned-grid arrangement of Fig. 16, where the inter-electrode capacities form a part of the external circuit will eliminate the difficulty. Second, the harmonic currents caused by the non-linear characteristics of the vacuum tube may introduce the effect of a reactive impedance back into the fundamental which may vary with battery voltage and so change the frequency. The remedy for this is to provide a low reactance path for the harmonics so that they have no opportunity to build up a reactive voltage across the tube, and also, by the use of grid-leaks and other such well-known devices, to reduce the harmonic currents generated by the tube.

What is claimed is:

1. A stable frequency oscillator comprising an electric discharge repeating device having a cathode, anode and impedance control electrode, an input and an output circuit therefor, a resonant frequency determining circuit energetically related to said input and output circuits, and a stabilizing reactance positioned between said frequency determining circuit and said device, said reactance having such a value that the frequency of the oscillator as a whole equals the resonant frequency of said resonant circuit.

2. The oscillator defined by claim 1 in which the stabilizing reactance is positioned between the frequency determining circuit and the anode.

3. The oscillator defined by claim 1 in which the stabilizing reactance is positioned between the frequency determining circuit and the impedance controlling electrode.

4. The oscillator defined by claim 1 in which an additional stabilizing reactance is positioned between said frequency determining circuit and said device, said stabilizing reactances being positioned between the frequency determining circuit and the anode and impedance controlling electrode respectively.

5. A stable frequency oscillator comprising an electric discharge repeating device, an input and an output circuit therefor, and a resonant circuit energetically related to said input and said output circuits, the impedances of the oscillator circuit as a whole having such values that the generated frequency is accurately the resonant frequency of said resonant circuit.

6. An oscillator comprising an electric discharge repeating device, an input circuit and an output circuit therefor, a resonant frequency determining circuit energetically related to said input and output circuits, and reactances positioned between said frequency determining circuit and said device and so valued relatively to the reactances in the immediately associated circuits that the circuit as a whole oscillates stably with respect to variations of resistances anywhere therein.

7. A stable frequency, self-excited oscillator, comprising a network regeneratively coupled through an amplifying device, said network having a plurality of meshes, said meshes each being series resonant at the oscillation frequency and coupled with each other by mutual impedances which are purely reactive.

8. A stable oscillator as defined in preceding claim including additionally a load circuit resonantly tuned at the oscillation frequency.

FREDERICK B. LLEWELLYN.